(12) United States Patent
Ito et al.

(10) Patent No.: US 7,536,096 B2
(45) Date of Patent: May 19, 2009

(54) AUTOFOCUS DEVICE AND METHOD

(75) Inventors: Yujiro Ito, Kanagawa (JP); Hidekazu Suto, Tokyo (JP); Shinji Takemoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 496 days.

(21) Appl. No.: 11/403,291

(22) Filed: Apr. 13, 2006

(65) Prior Publication Data
US 2006/0232700 A1    Oct. 19, 2006

(30) Foreign Application Priority Data
Apr. 15, 2005    (JP) .......................... P2005-119038

(51) Int. Cl.
G03B 13/32    (2006.01)
G03B 3/00    (2006.01)
G03B 13/00    (2006.01)

(52) U.S. Cl. .................... 396/90; 396/125; 348/345

(58) Field of Classification Search ............. 396/89–91, 396/135, 301, 302, 529, 531, 532, 125; 250/201.2; 348/345–347
See application file for complete search history.

(56) References Cited

U.S. PATENT DOCUMENTS 6,029,017 A * 2/2000 Miyazawa et al. .......... 396/532
6,624,402 B2 * 9/2003 Kaneko et al. ........... 250/201.2
6,750,914 B2 * 6/2004 Sannoh et al. .............. 348/346
7,098,954 B2 * 8/2006 Suda et al. .................. 348/347

FOREIGN PATENT DOCUMENTS

JP    10-213736    8/1998

* cited by examiner

Primary Examiner—Melissa J Koval
(74) Attorney, Agent, or Firm—Frommer Lawrence & Haug LLP; William S. Frommer; Thomas F. Presson

(57) ABSTRACT

An autofocus device comprising a lens-driving unit, a focal-point-position-detecting unit that detects a position of a focal point of the lens, and a distance measurement sensor. The sensor measures a distance to a subject based on a reference field of view for distance measurement and a field of view for distance measurement being offset outwardly from the reference field of view and/or a field of view for distance measurement having a field of view that is different from the reference field of view. The device has a control unit that controls the lens-driving unit to drive the lens to meet the position of the focal point of the lens to an in-focus position thereof. The focusing operation starts by setting the lens drive based on a representative value selected from measured distance results obtained by the distance measurement sensor and the position of the focal point of the lens.

7 Claims, 11 Drawing Sheets

AUTOFOCUS DEVICE AND METHOD

CROSS REFERENCE TO RELATED APPLICATION

The present invention contains subject matter related to Japanese Patent Application No. JP2005-119038 filed in the Japanese Patent Office on Apr. 15, 2005, the entire contents of which being incorporated herein by reference.

BACKGROUND OF THE INVENTION

1. Field of the Invention

This invention relates to autofocus device and method and a program product therefor, which are used in an imaging apparatus such as a video camera and a digital still camera.

2. Description of Related Art

The imaging apparatus such as a video camera and a digital still camera has been equipped with any autofocus mechanism that automatically focuses on a subject. The autofocus mechanism adds frequency components of an image signal in a particular region that is provided in an imaging frame (finder's view) to calculate a focus evaluation value thereof and drives a focus lens so that the maximum focus evaluation value can be given (see Japanese Patent Application Publication No. H10-213736). Thus, if imaging after such the particular region is set on a center of the imaging frame and a composition of the imaging frame is fixed to put the subject on the center of the imaging frame, the subject can be automatically in focus when a position of a focal point of the focus lens meets an in-focus position. In this autofocus mechanism, a focus adjustment operation using a measured distance result that indicates a distance to a subject is also done.

SUMMARY OF THE INVENTION

If decreasing a field of view for distance measurement to concentrate a narrower distance measurement area when the focus adjustment operation using a measured distance result that indicates a distance to a desired subject is done, it is possible to focus on the subject correctly by imaging the subject with it being put in the distance measurement area. If an image of the subject is imaged smaller because the long distance to the subject exists, it is possible to increase distance measurement accuracy because any influence by a background is reduced when decreasing the field of view for distance measurement to concentrate a narrower distance measurement area.

If, however, decreasing the field of view for distance measurement, the distance measurement area may be included within a subject. For example, as shown in FIG. 1, if decreasing the field of view for distance measurement by a distance measurement sensor 95 so that it can be set to 3 degrees, a distance measurement area is concentrated to an area having a diameter of 10.5 cm at a position extending forwardly by 2 m from the sensor 95. Thus, if the distance measurement is carried out using any difference in contracts of the subject and a person OB who wears a plain sweater without a pattern is imaged, it is difficult to measure a distance to the subject because there is no difference in contracts of the subject within the distance measurement area. This results in difficulty of carrying out an autofocus operation using the measured distance result.

It is desirable to present autofocus device and method and a program product therefor that can focus on a desired subject automatically using measured distance results to the desired subject by enhancing distance measurement performance.

According to an embodiment of the present invention, there is provided an autofocus device having a lens-driving unit that drives a lens, a focal-point-position-detecting unit that detects a position of a focal point of the lens, and a distance measurement sensor that measures a distance to a subject based on each of the fields of view for distance measurement. In the distance measurement sensor, a reference field of view for distance measurement and any one of a field of view for distance measurement being offset outwardly from the reference field of view for distance measurement and a field of view for distance measurement having a field of view that is different from the reference field of view for distance measurement are provided. The device also has a control unit that performs a focusing operation to control the lens-driving unit to drive the lens, thereby meeting the position of the focal point of the lens detected by the focal-point-position-detecting unit to an in-focus position thereof. The control unit allows the focusing operation to start by setting the lens drive based on a representative value that is selected from measured distance results obtained by the distance measurement sensor and the position of the focal point of the lens detected by the focal-point-position-detecting unit.

According to another embodiment of the present invention, there is provided an autofocus method. The autofocus method contains a focal-point-position-detecting step of detecting a position of a focal point of the lens. The method also contains representative-value-selecting step of providing in a distance measurement sensor a reference field of view for distance measurement and any one of a field of view for distance measurement being offset outwardly from the reference field of view for distance measurement and a field of view for distance measurement having a field of view that is different from the reference field of view for distance measurement, measuring a distance to a subject based on the fields of view for distance measurement by the distance measurement sensor to obtain measured distance results and selecting a representative value from the measured distance results thus obtained. The method further contains focus-processing step of starting the focusing operation to meet the position of the focal point of the lens detected in the focal-point-position-detecting step to an in-focus position thereof by setting the lens drive based on the representative value of the measured distance results and the detected position of the focal point of the lens.

According to further embodiment of the present invention, there is provided a computer program product that allows a computer to execute the above autofocus method.

According to any embodiments of the invention, the reference field of view for distance measurement is provided along an optical axis of the lens. A field of view for distance measurement being offset outwardly from the reference field of view for distance measurement and/or a field of view for distance measurement having a field of view that is different from the reference field of view for distance measurement can be provided. Priorities are set to each of the fields of view for distance measurement of the distance measurement sensor and if obtaining the measured distance results based on the plural fields of view for distance measurement, a measured distance result having a highest priority is selected as the representative value of the measured distance results. The focusing operation starts by setting the lens drive, namely, a driving direction and a driving speed of the focus lens, based on the representative value and the detected position of the focal point of the lens.

Thus, according to any embodiments of the invention, the representative value is selected from the measured distance results obtained by the distance measurement using plural fields of view for distance measurement and a lens drive is set based on this representative value and the detected position of the focal point of the lens, thereby starting the focusing operation. Thus, if it fails to get a correct measured distance result even when using the reference field of view for distance measurement, a field of view for distance measurement being offset outwardly from the reference field of view for distance measurement and/or a field of view for distance measurement having a field of view that is different from the reference field of view for distance measurement can be used to obtain measured distance results. By selecting and using the representative value from the measured distance results obtained by using these fields of view for distance measurement, the lens drive is set to start the focusing operation. Thus, it is possible to focus on a desired subject automatically using the measured distance results to the desired subject by enhancing distance measurement performance of the distance measurement sensor.

The concluding portion of this specification particularly points out and directly claims the subject matter of the present invention. However those skills in the art will best understand both the organization and method of operation of the invention, together with further advantages and objects thereof, by reading the remaining portions of the specification in view of the accompanying drawing(s) wherein like reference characters refer to like elements.

DESCRIPTION OF THE PREFERRED EMBODIMENTS

Figure 1:
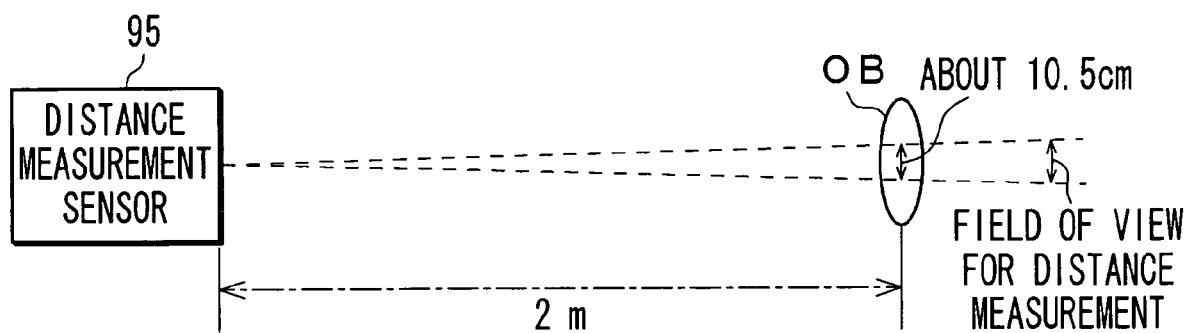
FIG. 1 is a drawing for illustrating a case where a field of view for distance measurement in a distance measurement sensor is decreased.
Figure 2:
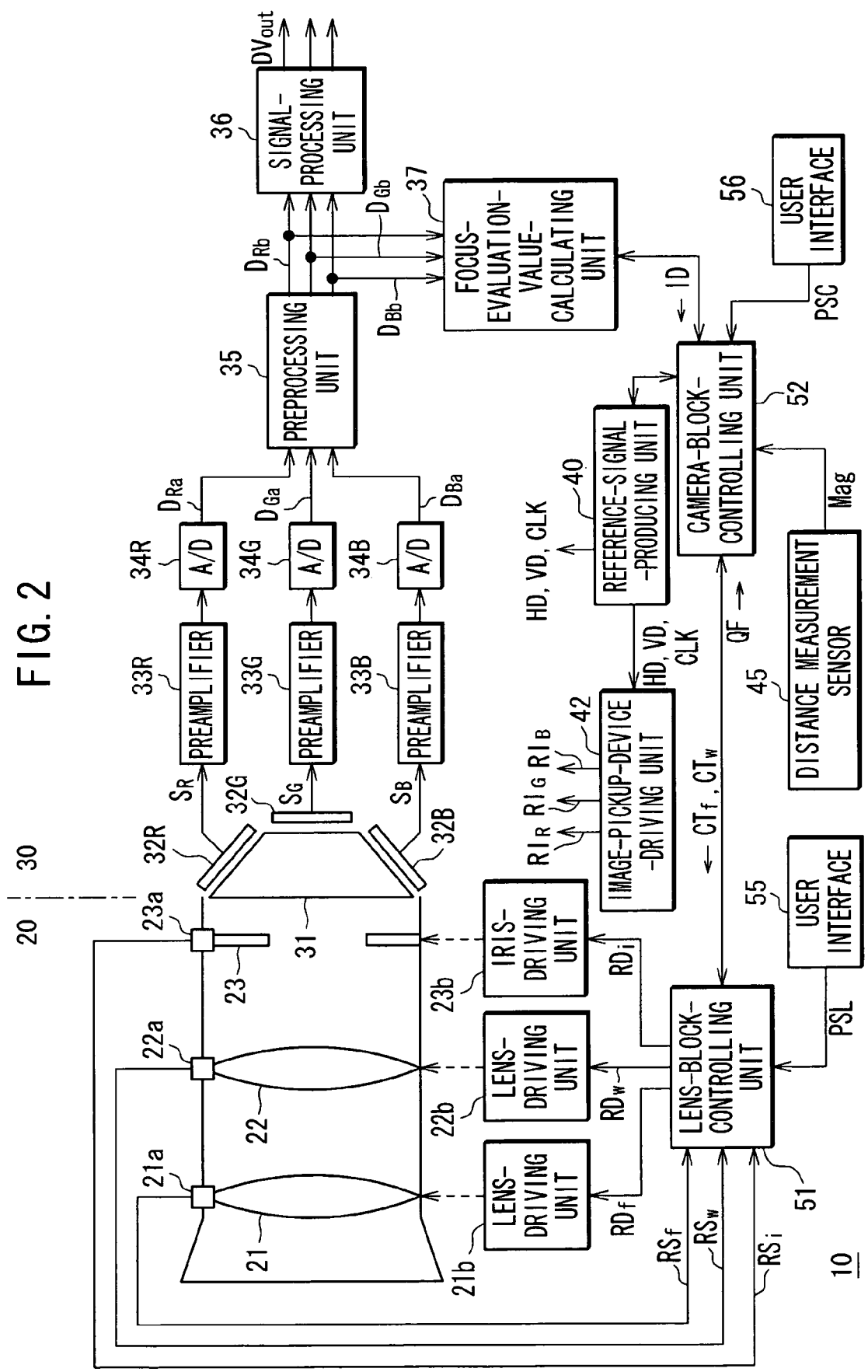
FIG. 2 is a block diagram for showing a configuration of an embodiment of a video camera according to the invention.

The following will describe embodiments of the invention with reference to the accompanying drawings. FIG. 2 shows a whole configuration of an imaging apparatus such as a video camera 10 having an autofocus mechanism.

A lens block 20 of the video camera 10 is constituted of an imaging lens, a lens-position-detecting unit that detects a position of the imaging lens, lens-driving unit that drives the imaging lens and the like. It is to be noted that in the lens block 20 shown in FIG. 2, as the imaging lens, a focus lens 21 for focusing an image of subject on an imaging surface of an imaging element and a wobbling lens 22 for utilizing determination of a driving direction of the focus lens 21 to meet a position of its focal point to an in-focus position are illustrated.

For the focus lens 21, are provided a lens-position-detecting unit 21a that detects a position of the focus lens 21, i.e. a focal-point-position-detecting unit that detects a position of a focal point of the focus lens 21, and a lens-driving unit 21b that drives the focus lens 21 to move the lens position along its optical axis.

Similarly, for the wobbling lens 21, are provided a lens-position-detecting unit 22a that detects a position of the wobbling lens 22 and a lens-driving unit 22b that drives the wobbling lens 22 to move the lens position along its optical axis, in order to perform any suitable wobbling.

The lens block 20 has an iris 23 to control an amount of incident light. For the iris 23, also are provided an iris-position-detecting unit 23a that detects an opening level of an aperture of the iris 23 and an iris-driving unit 23b that drives the iris 23 so to be opened or shut.

A lens-block-controlling unit 51 receives a detection signal RSf indicating a position of a focal point of focus lens 21 from the lens-position-detecting unit 21a, a detection signal RSw indicating an amount of wobbling from the lens-position-detecting unit 22a, a detection signal RSi indicating an opening level of an aperture of the iris 23 from the iris-position-detecting unit 23a, respectively. The lens-block-controlling unit 51 is connected to a user interface 55 for setting an autofocus operation mode and starting an autofocus operation. According to user's manipulations of the user interface 55, the lens-block-controlling unit 51 can receive any manipulation signals PSL. The lens-block-controlling unit 51 can also have a storage unit, which is not shown, that is constituted of a read-only memory (ROM), an electrically erasable programmable read-only memory (EEPROM) or the like. The storage unit may store data on focal length of each of the focus lens 21 and the wobbling lens 22 and data on aperture ratio as well as any information on a manufacturer's name and serial number of the lens block, and the like.

The lens-block-controlling unit 51 generates lens-driving signals RDf, RDw based on the stored information, the detection signals RSf, RSw, and RSi, and the manipulation signals PSL as well as a focus-controlling signal CTf and a wobbling-controlling signal CTw that are received from a camera-block-controlling unit 52, which will be described later. The lens-block-controlling unit 51 further supplies the generated lens-diving signal RDf to the lens-driving unit 21b to drive the focus lens 21, thereby allowing a desired subject to be focused. The lens-block-controlling unit 51 additionally supplies the generated lens-diving signal RDw to the lens-driving unit 22b to drive the wobbling lens 22, thereby allowing a direction of an in-focus position of the focus lens 21 to be detected. The lens-block-controlling unit 51 also generates an iris-controlling signal RDi and supplies it to the iris-driving unit 23b, thereby allowing the opening level of aperture of the iris 23 to be controlled.

A color separation prism 31 in a camera block 30 separates incident light from the lens block 20 into three primary colors of red (R), green (G), and blue (B) and supplies R component thereof to an image pickup device 32R, G component thereof to an image pickup device 32G, and B component thereof to an image pickup device 32B, respectively.

The image pickup device 32R generates an image signal SR corresponding to the R component by photoelectric conversion and supplies it to the preamplifier 33R. The image pickup device 32G generates an image signal SG corresponding to the G component by the photoelectric conversion and supplies it to the preamplifier 33G. The image pickup device 32B generates an image signal SB corresponding to the B component by the photoelectric conversion and supplies it to the preamplifier 33B.

The preamplifier 33R amplifies a level of the image signal SR, performs correlated dual sampling thereon to reduce any reset noise, and supplies the noise-reduced image signal SR to an A/D converter 34R. The A/D converter 34R receives the image signal SR, converts it into a digital image signal DRa, and supplies it to a preprocessing unit 35.

The preamplifier 33G amplifies a level of the image signal SG, performs correlated dual sampling thereon to reduce any reset noise, and supplies the noise-reduced image signal SG to an A/D converter 34G. The A/D converter 34G receives the image signal SG, converts it into a digital image signal DGa, and supplies it to the preprocessing unit 35.

The preamplifier 33B amplifies a level of the image signal SB, performs correlated dual sampling thereon to reduce any reset noise, and supplies the noise-reduced image signal SB to an A/D converter 34B. The A/D converter 34B receives the image signal SB, converts it into a digital image signal DBa, and supplies it to the preprocessing unit 35.

The preprocessing unit 35 receives the image signals DRa, DGa, and DBa to adjust their gains and to perform a stability of black level, an adjustment of dynamic range thereof and the like to generate image signals DRb, DGb, and DBb, and supplies the image signals DRb, DGb, and DBb thus generated to a signal-processing unit 36 and a focus evaluation value-calculating unit 37.

The signal-processing unit 36 receives the image signals DRb, DGb, and DBb to perform various kinds of signal processing on them, thereby generating image output signals DVout. For example, Knee compensation for compressing an image signal having a level over a set level, gamma correction for correcting a level of the image signal according to any various set gamma curves, and white and black clipping for limiting a level of the image signal to stay into a set region are performed. The signal-processing unit 36 also performs edge enhancement processing, linear matrix processing, encoding processing for generating the image output signal DVout having a desired format and the like.

The focus evaluation value-calculating unit 37 calculates any focus evaluation values ID from the image signals DRb, DGb, and DBb using frequency components of these image signals in a particular region that is provided in an imaging frame and supplies the focus evaluation values ID to the camera-block-controlling unit 52.

Figure 3:
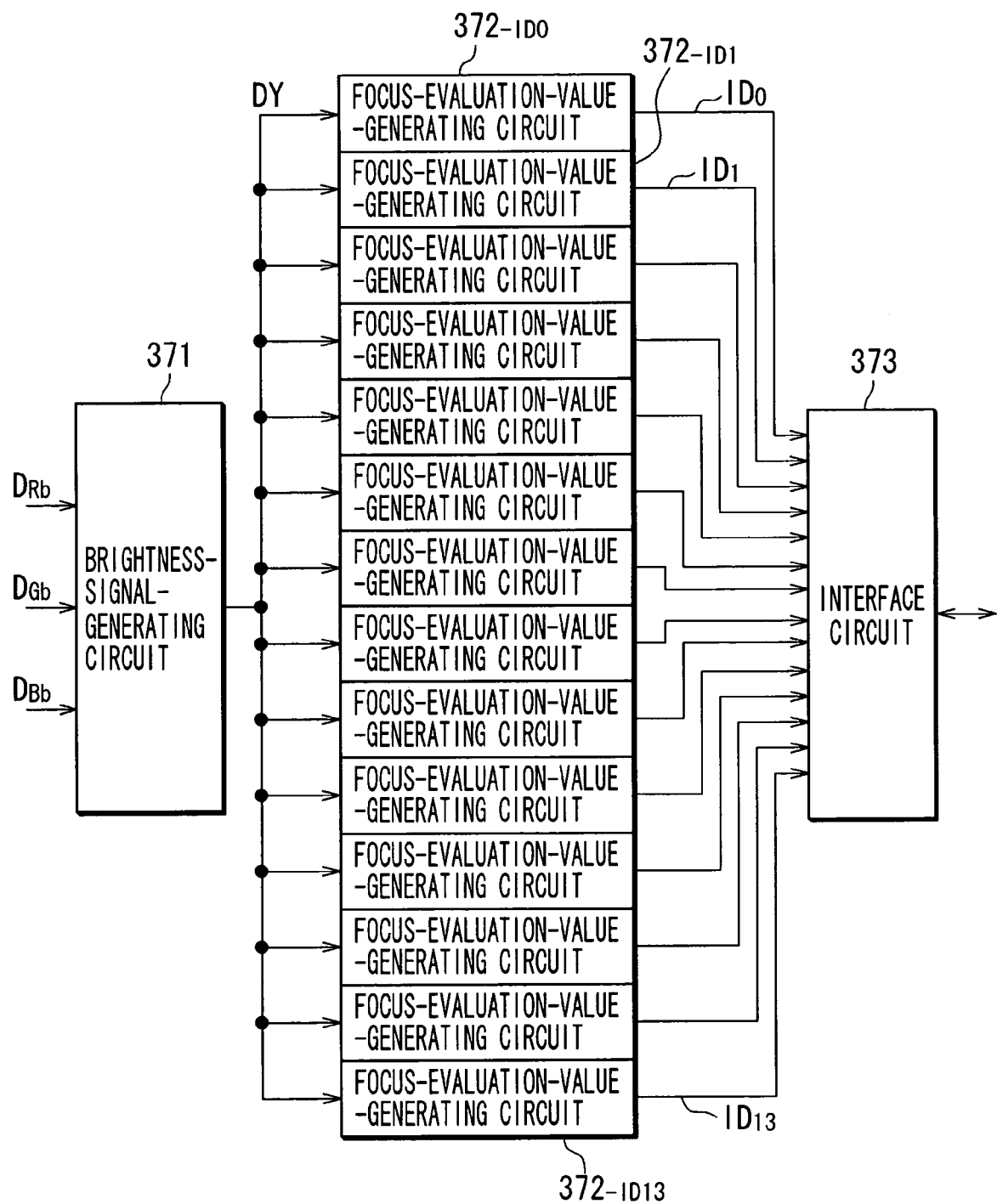
FIG. 3 is a block diagram for showing a configuration of a focus-evaluation-value-calculating unit.

FIG. 3 shows a configuration of the focus evaluation value-calculating unit 37. The focus evaluation value-calculating unit 37 has a brightness-signal-generating circuit 371 for generating a brightness signal DY based on the image signals DRb, DGb, and DBb, focus evaluation value-generating circuits 372-ID0 through 372-ID13 for generating fourteen kinds of focus evaluation values ID0 through ID13, which will be described later, and an interface circuit 373 for communicating with the camera-block-controlling unit 52 and supplying the generated focus evaluation values ID0 through ID13 to the camera-block-controlling unit 52 according to any request from the camera-block-controlling unit 52.

By using the image signals DRb, DGb, and DBb received from the preprocessing circuit 35, the brightness-signal-generating circuit 371 generates the brightness signal DY calculating as follows: DY=0.30DRb+0.59DGb+0.11 DBb.

This is because it is adequate to determine whether a contrast is high or low in order to determine whether the focus is achieved and adequate to detect an alteration in level of the brightness signal DY as an alteration in the contrast.

The focus evaluation value-generating circuit 372-ID0 generates the following focus evaluation values ID0. Similarly, each of the focus evaluation value-generating circuits 372-ID1 through 372-ID13 generates the following focus evaluation values ID1 through ID13.

Focus evaluation value ID0: a name of focus evaluation value, "IIR1_W1$_{HPeak}$";

Focus evaluation value ID1: a name of focus evaluation value, "IIR1_W2_HPeak";

Focus evaluation value ID2: a name of focus evaluation value, "IIR1_W2_HPeak";

Focus evaluation value ID3: a name of focus evaluation value, "IIR4_W3_HPeak";

Focus evaluation value ID4: a name of focus evaluation value, "IIR0_W1_VIntg";

Focus evaluation value ID5: a name of focus evaluation value, "IIR3_W1_VIntg";

Focus evaluation value ID6: a name of focus evaluation value, "IIR1_W1_HIntg";

Focus evaluation value ID7: a name of focus evaluation value, "Y_W1$_{HIntg}$";

Focus evaluation value ID8: a name of focus evaluation value, "Y_W1$_{Satul}$";

Focus evaluation value ID9: a name of focus evaluation value, "IIR1_W3_HPeak";

Focus evaluation value ID10: a name of focus evaluation value, "IIR1_W4_HPeak";

Focus evaluation value ID11: a name of focus evaluation value, "IIR1_W5_HPeak";

Focus evaluation value ID12: a name of focus evaluation value, "Y_W3_HIntg; and

Focus evaluation value ID13: a name of focus evaluation value, "Y_W3_HIntg.

Herein, to the above focus evaluation values ID0 trough ID13, respectively, are applied the names of focus evaluation values indicating attributes thereof, "use data_a size of evaluation window_a calculation method of focus evaluation value". The evaluation window is a particular region that is provided in an image frame.

These focus evaluation values ID0 through ID13 are basically obtained by adding frequency components of an image signal together in the evaluation window and indicate values corresponding to any blurs in an image.

There are "IIR" and "Y" in the "use data" of the names of focus evaluation values. The "IIR" uses data on high frequency component that is filtered out of the brightness signal DY by using a high-pass filter (HPF). The "Y" uses frequency component of the brightness signal DY as it is without using any HPF.

When using HPF, an infinite impulse response (IIR) typed HPF may be used. Based on species of HPF, IIR is classified into IIR0, IIR1, IIR3, and IIR4, which represent HPFs having different cut-off frequencies. Setting HPF so as to have different cut-off frequencies allows an alteration in the focus evaluation values to be enlarged, for example, at a near position of in-focus position if an HPF having a high cut-off frequency is used, in contrast with a case where an HPF having a low cut-off frequency is used. If it is hardly focused, an alteration in the focus evaluation values can be enlarged when an HPF having a low cut-off frequency is used, in contrast with a case where an HPF having a high cut-off frequency is used. Thus, HPF can be set so as to have different cut-off frequencies, in order to select a most suitable focus evaluation value according to any focus situation during auto-focus operations.

The size of evaluation window is a size of image region to be used for generating the focus evaluation value. In this embodiment, various sizes of the evaluation window illustrate the following five species of the sizes of the evaluation windows W1 through W5.

Size of evaluation window W1:116 pixels by 60 pixels;
Size of evaluation window W2:96 pixels by 60 pixels;
Size of evaluation window W3:232 pixels by 120 pixels;
Size of evaluation window W4:192 pixels by 120 pixels; and
Size of evaluation window W5:576 pixels by 180 pixels.

Figure 4:
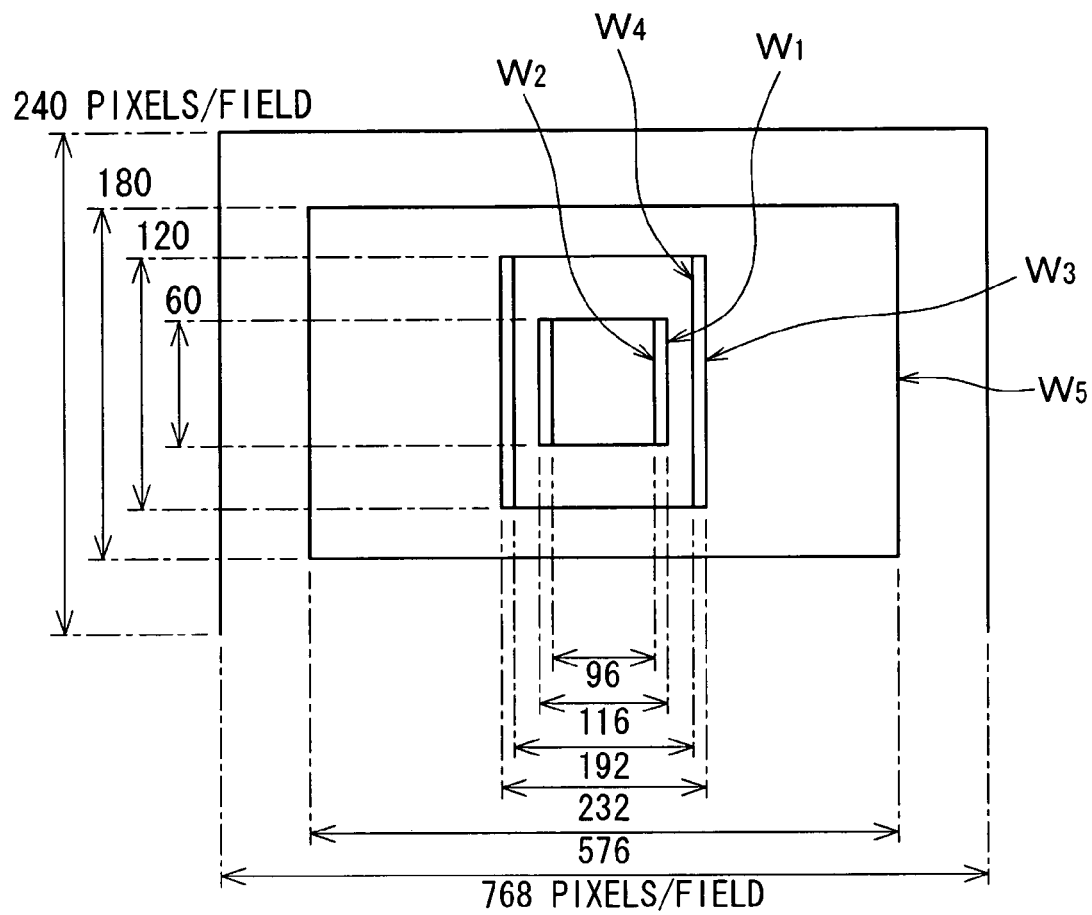
FIG. 4 is a diagram for showing sizes of evaluation windows.

A center of each of these evaluation windows aligns a center of imaging frame. It is to be noted that, in FIG. 4, the sizes of the evaluation windows W1 through W5 are illustrated in a case where a frame size of one field is 768 pixels by 240 pixels.

Thus, setting the evaluation windows so as to have a various kinds of sizes thereof allows to be produced any focus evaluation values each suitable to any sizes of the evaluation windows. This allows any suitable focus evaluation values to be selected among the focus evaluation values ID0 through ID13 to meet whatever size a target subject has.

As the calculation method of focus evaluation value, HPeak scheme, HIntg scheme, VIntg scheme, and Satul scheme may be illustrated. The HPeak scheme is a calculation method of horizontal direction focus evaluation values relative to any peaks. The HIntg scheme is a calculation method of horizontal direction focus evaluation values relative to any horizontal and vertical integration. The VIntg scheme is a calculation method of vertical direction focus evaluation values relative to any integration. The Satul scheme is a calculation method of calculating a number of pixels saturated in brightness thereof.

The HPeak scheme is also a calculation method of focus evaluation values for obtaining any high frequency component from a horizontal direction image signal using HPF. In this embodiment, it is used for calculating the focus evaluation values ID0, ID1, ID2, ID3, ID9, ID10, and ID11.

Figure 5:
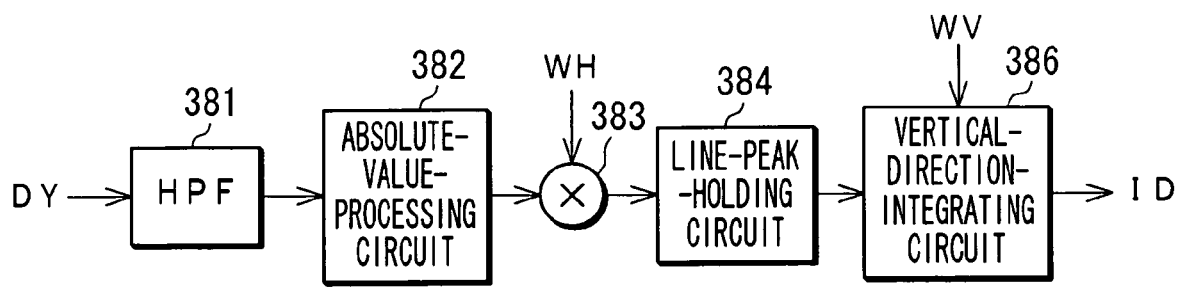
FIG. 5 is a block diagram for showing a configuration of a calculation filter for filtering a horizontal direction focus evaluation value.

FIG. 5 shows a configuration of a calculation filter for filtering a horizontal direction focus evaluation value to be used for the HPeak scheme, which may be used in the focus evaluation value-calculating unit 37. This calculation filter for filtering a horizontal direction focus evaluation value has an HPF 381 for filtering only high frequency components out of brightness signal DY from a brightness-signal-generating circuit, an absolute-processing circuit 382 for computing an absolute of this high frequency components, a multiplication circuit 383 for multiplying the absolute of this high frequency components by a horizontal direction window control signal WH, a line-peak-holding circuit 384 for holding a peak value per one line, and a vertical-direction-integrating circuit 386 for vertically integrating peak values of all the lines within the evaluation window.

The HPF 381 filters high frequency components out of the brightness signal DY and the absolute-processing circuit 382 computes an absolute of these high frequency components. The multiplication circuit 383 multiplies the absolute by the horizontal direction window control signal WH to obtain an absolute value of the high frequency components within the evaluation window. In other words, if supplying to the multiplication circuit 383 a window control signal WH of which a multiplied value becomes zero out of the evaluation window, it is possible to supply to the line-peak-holding circuit 384 only a horizontal direction absolute of the high frequency components within the evaluation window. Further, if setting a window control signal WH so that the multiplied value can become smaller at a position near a window in the evaluation window, it is possible to eliminate any noise in the focus evaluation values based on an influence on an invasion of any extra-edges (any edges having high brightness) that exist near the window of the evaluation window into the evaluation window, which occurs responding to an advance of focusing, and an abrupt alteration in the focus evaluation values accompanied with any rolling and/or pitching of a subject.

The line-peak-holding circuit 384 may hold a peak value for every line. The vertical-direction-integrating circuit 386 vertically adds or integrates peak values, which have been held, of each line within the evaluation window based on a vertical direction window control signal WV to generate any focus evaluation values ID. It is to be noted that this scheme is so called as "HPeak" because a horizontal direction peak is once held.

Figure 6:
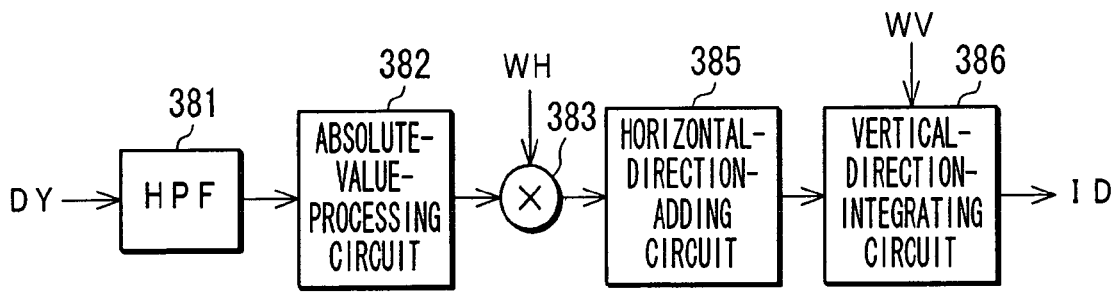
FIG. 6 is a block diagram for showing a configuration of a calculation filter of a horizontal and vertical direction integral scheme for filtering a horizontal direction focus evaluation value.

The HIntg scheme is a calculation method of focus evaluation values for obtaining horizontal direction focus evaluation values by using a vertical and horizontal integration. FIG. 6 shows a configuration of a calculation filter for filtering a horizontal direction focus evaluation value according to the vertical and horizontal integration, which may be used in the focus evaluation value-calculating unit 37. This calculation filter has a configuration similar to the above calculation filter of HPeak scheme as shown in FIG. 5 except for using a horizontal-direction-adding circuit 385 in stead of the line-peak-holding circuit. In this calculation filter shown in FIG. 6, the horizontal-direction-adding circuit 385 horizontally adds all the absolute values of the high frequency components within the evaluation window and the vertical-direction-integrating circuit 386 vertically integrates the added result of all the lines in the evaluation window.

Such the calculation filter for filtering a horizontal direction focus evaluation value according to the vertical and horizontal integration is used for calculating the focus evaluation values ID6, ID7, ID12, and ID13, in this embodiment.

As comparing the HIntg scheme with the HPeak scheme, they are different from each other in that in the HPeak scheme, a peak value is calculated for every line and the calculated peak values are vertically added while in the HIntg, all the absolute values of the high frequency components in each line within the evaluation window are horizontally added and the added ones are vertically integrated.

The HIntg scheme is classified into "IIR1" that a high frequency component is used in its use data and "Y" that uses therein the brightness signal DY itself as it is. It is to be noted that a brightness-adding-value-calculating filter circuit, which is a filter circuit that removes HPF 381 from the calculation filter shown in FIG. 6, can get a brightness-adding value.

The VIntg scheme is a calculation method of focus evaluation values for obtaining vertical direction focus evaluation values by using a vertical integration. In this embodiment, it is used for calculating the focus evaluation values ID4, and ID5. Both of the HPeak and HIntg schemes perform a horizontal addition to produce the focus evaluation values while the VIntg scheme adds high frequency components vertically to produce the focus evaluation values. If only the vertical high frequency components exist but no horizontal high frequency component exist, for example, an image in which an upper half of scene is white and a lower half of the scene is black, i.e., an image of the horizon or the like, the calculation method of horizontal direction focus evaluation values according to the HPeak scheme does not effectively function. The focus evaluation values of the VIntg scheme are used for the autofocus to function effectively in such the scenes.

Figure 7:
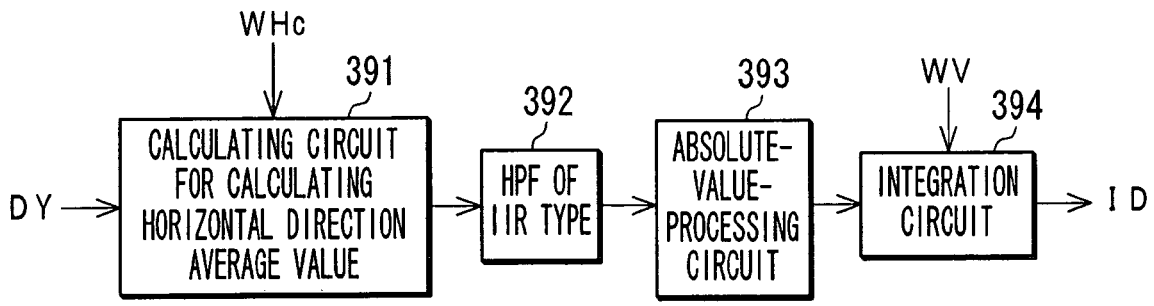
FIG. 7 is a block diagram for showing a configuration of a calculation filter for filtering a vertical direction focus evaluation value.

FIG. 7 shows a configuration of a calculation filter for filtering a vertical direction focus evaluation value, which may be used in the focus evaluation value-calculating unit 37. The calculation filter for filtering a vertical direction focus evaluation value has a calculating circuit 391 for calculating a horizontal direction average value, an HPF 392 of IIR type, an absolute-value-processing circuit 393, and an integration circuit 394.

The calculating circuit 391 selects from the brightness signal DY of each line a brightness signal of any pixels (for example, 63 pixels) positioned at a center portion of the evaluation window in a horizontal direction thereof based on a window control signal WHc and calculates an average value (similar to a sum total) thereof to transmit it as one output per one horizontal period. It is because any noise existed at a periphery of the evaluation window is eliminated to select 64 pixels of the center portion thereof. In this embodiment, since data of 64 pixels is stored in sequence and one average value is finally output, a simple configuration without any necessary for storage device such as a line memory or a frame memory can be achieved. Next, HPF 392 of IIR type filters a high frequency component with it being synchronized with a line frequency. The absolute-value-processing circuit 393 then computes an absolute of the high frequency components. The integration circuit 394 vertically integrates all the lines within the evaluation window based on the vertical direction window control signal WV.

The Satul scheme is a calculation method for obtaining a number of saturated pixel in the brightness signal DY (particularly, a number of the pixel of which brightness level becomes over a predetermined level) in the evaluation window. In this embodiment, the Satul scheme is used for calculating the focus evaluation value ID8. In the calculation of the focus evaluation value ID8, the focus evaluation value ID8 is determined by calculating how many pixels exceeding a threshold value $\alpha$ stay in the evaluation window for each field with the brightness signal DY being compared to the threshold value $\alpha$.

Referring back to FIG. 2, a reference-signal-producing unit 40 produces a vertical synchronizing signal VD, a horizontal synchronizing signal HD, and a reference clock signal CLK, based on which each unit in the video camera 10 operates. The reference-signal-producing unit 40 supplies these signals to an image-pickup-device-driving unit 42. The image-pickup-device-driving unit 42 generates a driving signal RIR based on the vertical synchronizing signal VD, the horizontal synchronizing signal HD, and the reference clock signal CLK thus supplied to supply it to the image pickup device 32R in order to drive it. Similarly, the image-pickup-device-driving unit 42 also generates driving signals RIG, RIB, respectively, to supply them to the image pickup devices 32G, 32B in order to drive them. It is to be noted that the preamplifiers 33R, 33G, and 33B, the A/D converters 34R, 34G, and 34B, the preprocessing unit 35, the signal-processing unit 36, the focus evaluation value-calculating unit 37 and the like performs various kinds of processing using the vertical synchronizing signal VD, the horizontal synchronizing signal HD, and the reference clock signal CLK that are synchronized with an image signal received from their respective previous units. These signals may be received from the reference-signal-producing unit 40 or from their respective previous units together with the image signal.

A distance measurement sensor 45 performs distance measurement for measuring a distance to the subject to supply to the camera-block-controlling unit 52 a measured distance result Mag indicating the distance to the subject. The distance measurement sensor 45 may set its field of view for distance measurement so that a reference field of view for distance measurement and a field of view for distance measurement that is offset outwardly from the reference field of view for distance measurement and/or a field of view for distance measurement having a field of view that is different from the reference field of view for distance measurement can be consecutively arranged. This consecutive arrangement of the fields of view for distance measurement prevents the measured distance result from failing to be obtained when a distance measurement impracticable region occurs between the fields of view for the distance measurement and the subject enters into the region. It thus is possible to perform any distance measurement accurately.

Figure 8:
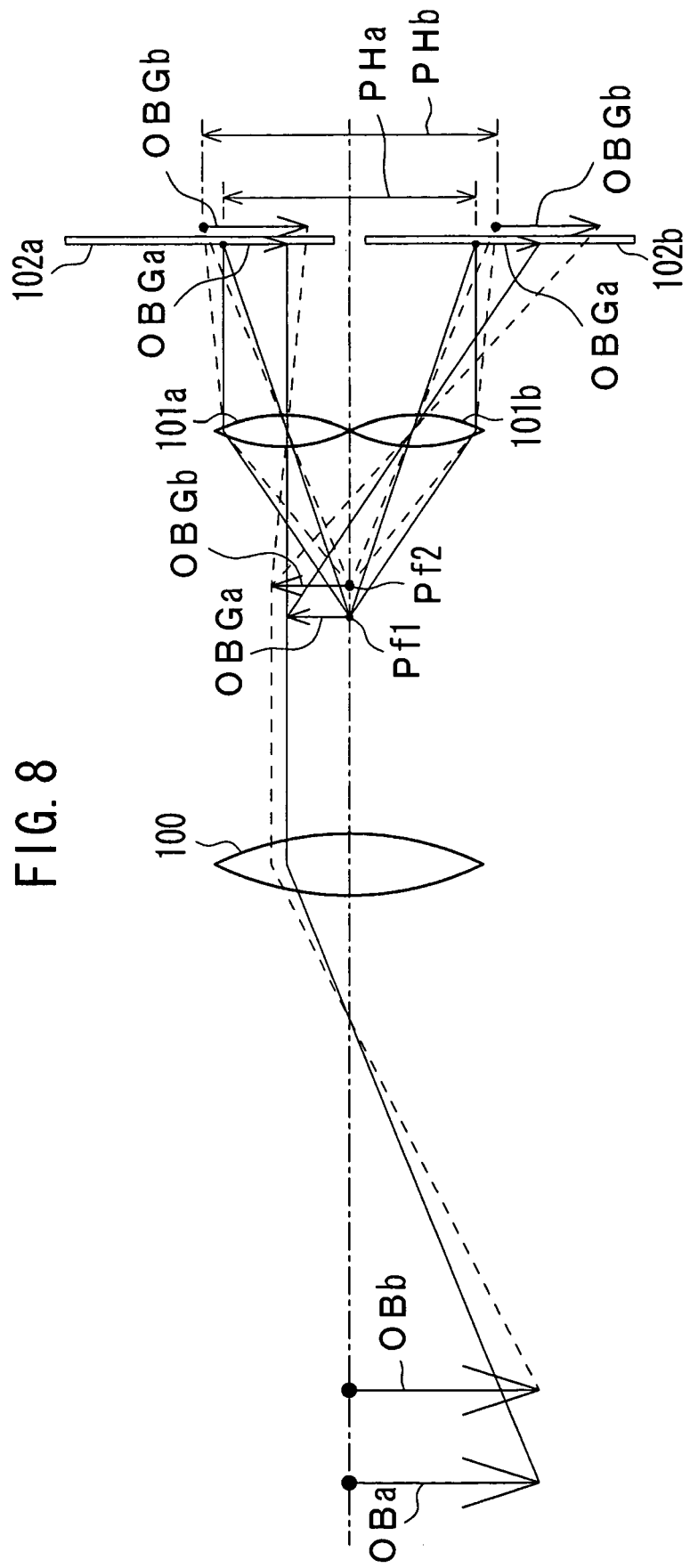
FIG. 8 is a drawing for illustrating a principle of the distance measurement sensor of phase difference scheme.

The following will describe a distance measurement sensor of, for example, phase difference scheme that is capable of setting plural fields of view for distance measurement therein. FIG. 8 illustrates a principle of the distance measurement sensor of phase difference scheme. The distance measurement sensor has a main lens 100, a pair of secondary bond lenses 101a, 101b, and a pair of image sensors 102a, 102b. By the main lens 100, an aerial image OBGa of a subject OBa is in focus on a position Pf1, for example. The aerial image OBGa is also in focus on the image sensors 102a, 102b, respectively, by the secondary bond lenses 101a, 101b. It is estimated that a distance between the corresponding points in the aerial images OBGa that focus on the image sensors 102a, 102b is a phase difference PHa, any correlation calculation is carried out between an image on the image sensor 102a and an image on the image sensor 102b. The phase difference PHa can be obtained from a position of the image having a highest correlation value.

Next, by the main lens 100, an aerial image OBGb of a subject OBb that exists nearer than the subject OBa is in focus on a position Pf2 that exists nearer the secondary bond lenses than the position Pf1. The aerial image OBGb is also in focus on a position away from the image sensors 102a, 102b, respectively, by the secondary bond lenses 101a, 101b. A phase difference PHb obtained by any correlation calculation that is carried out between an image on the image sensor 102a and an image on the image sensor 102b appears larger than the phase difference PHa. Thus, the phase difference alters according to a distance to a subject and by detecting the phase difference, the distance to the subject can be measured.

If regions in the image sensor used for the correlation calculation are switched, a distance measurement can be performed for each of the fields of view for distance measurement. For example, if a field of view is set to include black points (portions existed on an optical axis) of the subjects OBa, OBb, the distance to the subject included in the field of view for distance measurement can be measured when any correlation calculation is performed on the black points of the subjects OBa, OBb that are formed on the image sensors 102a, 102b. Similarly, if a field of view is set to include arrow points (forward end portions thereof) of the subjects OBa, OBb, the distance to the subject included in the field of view for distance measurement can be measured when any correlation calculation is performed on a region of the arrow points of the subjects OBa, OBb that are formed on the image sensors 102a, 102b.

Figure 9:
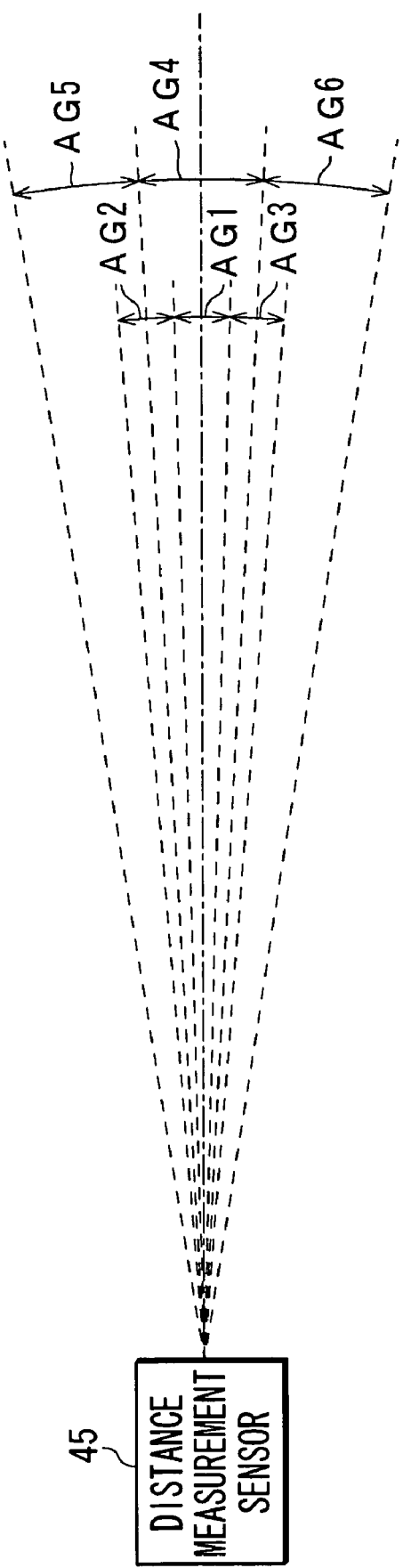
FIG. 9 is a drawing for illustrating distance measurement method in the distance measurement sensor in which plural fields of view for distance measurement are provided.

FIG. 9 illustrates plural fields of view for distance measurement that are provided in the distance measurement sensor 45. For example, on a field of view AG1 for distance measurement having an angle of three degrees, fields of view AG2, AG3 for distance measurement each being offset outwardly from the field of view AG1 for distance measurement are set so as to be consecutively arranged. A field of view AG4 for distance measurement having an angle of six degrees more than that of the field of view AG1 for distance measurement can be set. Further, fields of view AG5, AG6 for distance measurement each having an angle of six degrees more than that of the field of view AG1 for distance measurement and being offset outwardly from the field of view AG1 for distance measurement can be set so as to be consecutively arranged on the field of view AG4 for distance measurement.

The reference field of view AG1 for distance measurement is set along an optical axis of the imaging lens in the lens block 20. This setting of the reference field of view AG1 for distance measurement along the optical axis allows distance measurement performance on the subject positioned in a center of the imaging frame to be enhanced.

The distance measurement sensor 45 performs distance measurement for each of the fields of view for distance measurement. When the distance measurement sensor 45 performs distance measurement, it transmits a measured distance result Mag indicating a distance to the subject. When the distance measurement sensor 45 fails to perform any distance measurement, it transmits data (hereinafter referred to as "inability data NG") indicating inability to perform any measurement as the measured distance result Mag.

Priorities are set to each of the plural fields of view for distance measurement. For example, a higher priority is set to a field of view for distance measurement that is set in a center of the imaging frame as compared with a field of view for distance measurement that is offset outwardly. A higher priority is set to a field of view for distance measurement that has a small angle as compared with a field of view for distance measurement that has a wide angle. If obtaining the measured distance results by the plural fields of view for distance measurement, a measured distance result having higher priority by the plural fields of view for distance measurement is selected and it is set as a representative value Magd of the measured distance results, which indicates a measured distance to the subject. Any one of the distance measurement sensor 45 and the camera-block-controlling unit 52 can select the measured distance results. For example, if the camera-block-controlling unit 52 selects the representative value Magd of the measured distance results, it is possible to use a general-purpose distance measurement sensor, thereby enabling the inexpensive video camera 10 to be configured. If the distance measurement sensor 45 selects the representative value Magd of the measured distance results, it can reduce any load in the camera-block-controlling unit 52. It is to be noted that the following will describe a case where the camera-block-controlling unit 52 selects the representative value Magd.

The camera-block-controlling unit 52 is connected to the user interface 56. The camera-block-controlling unit 52 generates any control signals based on a manipulation signal PSC received from the user interface 56 and supplies the control signals to respective units to control them so that the video camera 10 can operate based on the manipulation signal PSC or the like. The camera-block-controlling unit 52 further selects the representative value Magd from the measured distance results Mag for each of the fields of view for distance measurement that is obtained by the distance measurement sensor 45.

The lens-block-controlling unit 51 and the camera-block-controlling unit 52 can be communicated to each other using a previously set format and/or a previously set protocol. The lens-block-controlling unit 51 and the camera-block-controlling unit 52 perform any control on autofocus operations.

The lens-block-controlling unit 51 also supplies to the camera-block-controlling unit 52 various kinds of information QF (for example, information on a position of a focal point of the lens, an iris value and the like) responding a request from the camera-block-controlling unit 52.

The lens-block-controlling unit 51 further generates lens-driving signals RDf, RDw based on the focus control signal CTf, the wobbling control signal CTw and the like that are received from the camera-block-controlling unit 52 and controls the lens-driving units 21b, 22b to drive the focus lens 21 and wobbling lens 22.

The camera-block-controlling unit 52 generates the focus control signal CTf for performing a drive control of the focus lens 21 and the wobbling control signal CTw for performing a drive control of the wobbling lens 22, based on the focus evaluation values ID calculated in the focus evaluation value-calculating unit 37, the measured distance result Mag obtained by the distance measurement sensor 45, and various kinds of information read out of the lens-block-controlling unit 51. The camera-block-controlling unit 52 supplies them to the lens-block-controlling unit 51.

The lens-block-controlling unit 51 and the camera-block-controlling unit 52 can be built-in together. In the following description, a controller 50 will indicate a combination of the lens-block-controlling unit 51 and the camera-block-controlling unit 52. The controller 50 may be constituted of microcomputer, a memory and the like and execute autofocus operations by running various programs read out of the memory.

Figure 10:
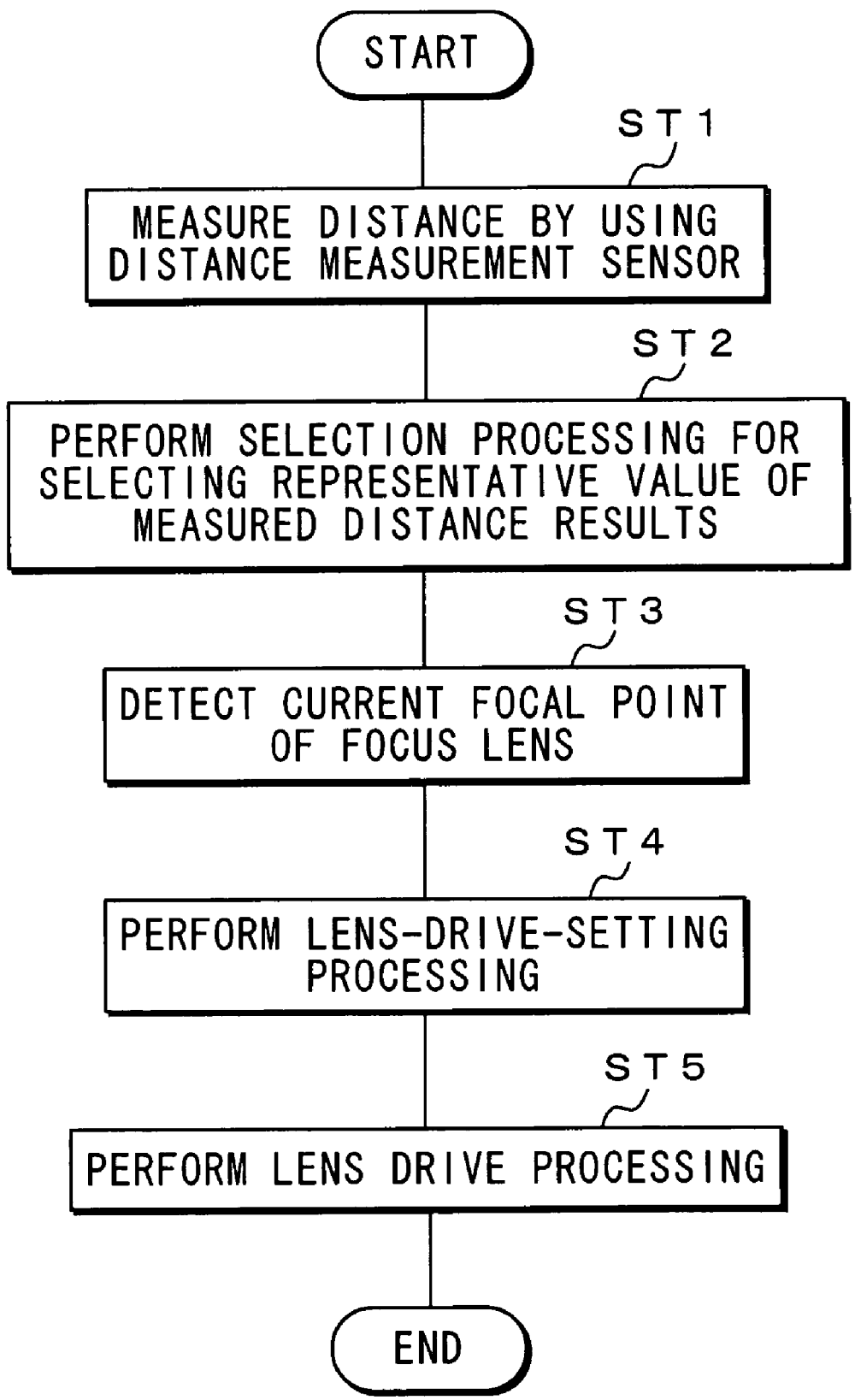
FIG. 10 is a flowchart for showing autofocus operations of the video camera.

The following will describe autofocus operations of the video camera 10. FIG. 10 shows a flowchart of the autofocus operations.

At a step ST1, the controller 50 controls the distance measurement sensor 45 to measure the distance to a subject. In the distance measurement sensor 45, the reference field of view for distance measurement, and a field of view for distance measurement that is offset outwardly from the reference field of view for distance measurement and/or a field of view for distance measurement having an angle that is different from that of the reference field of view for distance measurement are set so as to be consecutively arranged in order to reduce an occurrence of a case where any distance measurement is filed.

If there is one field of view for distance measurement having a small angle, a case where it is difficult to generate any difference in contrasts of the subject may occur. If, however, the fields of view AG4 through AG6 for distance measurement are provided, a range of the fields of view for distance measurement has an angle of eighteen degrees. In this case, the distance measurement area has a diameter of 63 cm at a position extending forwardly by 2 m from the sensor and a contour of a person OB who wears a plain sweater without a pattern is included within the field of view for distance measurement, thereby enabling a distance to the subject to be determined. Since the field of view AG1 for distance measurement is set to have an angle of three degrees, the distance measurement area has a diameter of 37 cm at a position extending forwardly by 7 m, for example. When imaging a doll having a width of 20 cm, the doll occupies more than a half of the field of view so that it is possible to measure a distance to the doll correctly without any influence of the background.

At a step ST2, the controller 50 performs selection processing for selecting a representative value, which indicates a distance to the subject, from the measured distance results by fields of view for distance measurement. In this selection processing for selecting the representative value, if obtaining plural measured distance results by fields of view for distance measurement, a measured distance result by the field of view for distance measurement having higher priority is selected and it is set as a representative value of measured distance results.

Figure 11:
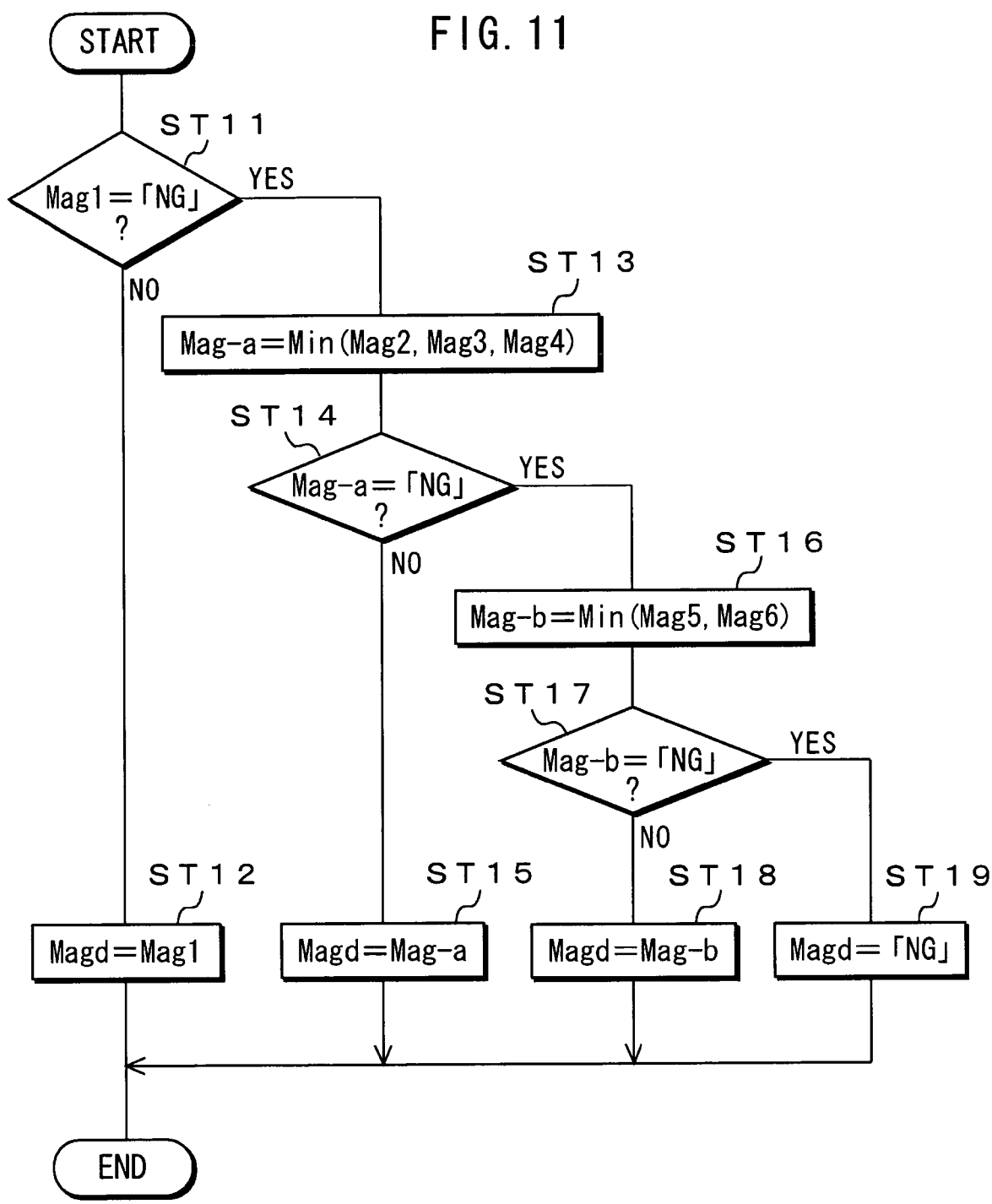
FIG. 11 is a flowchart for showing selection processing for selecting a representative value from the measured distance results.

FIG. 11 shows the selection processing for selecting the representative value from the measured distance results. In FIG. 11, a case where six fields of view AG1 through AG6 for distance measurement as shown in FIG. 9 are provided in the distance measurement sensor 45 will be described.

If plural fields of view for distance measurement are provided, priorities are previously set to each of the plural fields of view for distance measurement. The priorities are set based on what position of the subject is in focus in the imaging frame. For example, if a desired subject is imaged with it being positioned at a center of the imaging frame, higher priority is set to the field of view that is set to the center of the imaging frame as compared with a field of view that is offset outwardly. In order to obtain a correct measured distance result even if there is a long distance away from the subject, higher priority is set to a field of view having a small angle as compared with a field of view having a wide angle. Thus, the highest priority is set to the field of view AG1 for distance measurement shown in FIG. 9. Lower priorities are set to the fields of view AG5, AG6 for distance measurement shown in FIG. 9.

At step ST 11, the controller 50 determines whether the measured distance result Mag1 by the field of view AG1 for distance measurement that has the highest priority is inability data NG. If the measured distance result Mag1 is not inability data NG, the processing goes to a step ST12 while if the measured distance result Mag1 is inability data NG, the processing goes to a step ST13.

At the step ST12, the controller 50 sets the measured distance result Mag1 as the representative value Magd of the measured distance results, which indicates a distance to the subject and the processing is completed.

At the step ST13, the controller 50 selects a minimum measured distance result that has a shortest distance among the measured distance results Mag2, Mag3, Mag4 of the fields of view AG2, AG3, AG4 for distance measurement, which have a second highest priority and sets the selected one as a measured distance result Mag-a. It is to be noted that the inability data NG is treated as a larger value than the maximum in the distance measurement allowable values, and if all of the measured distance results Mag2, Mag3, Mag4 are the inability data NG, the measured distance result Mag-a is set as the inability data NG.

At step ST14, the controller 50 determines whether the measured distance result Mag-a is inability data NG. If the measured distance result Mag-a is not inability data NG, the processing goes to a step ST15 while if the measured distance result Mag-a is inability data NG, the processing goes to a step ST16.

At the step ST15, the controller 50 sets the measured distance result Mag-a as the representative value Magd of the measured distance results and the processing is completed.

At the step ST16, the controller 50 selects a minimum measured distance result that has a shorter distance between the measured distance results Mag5, Mag6 of the fields of view AG5, AG6 for distance measurement, which have lower priority and sets the selected one as a measured distance result Mag-b. If both of the measured distance results Mag5, Mag6 are the inability data NG, the measured distance result Mag-b is set as the inability data NG.

At the step ST17, the controller 50 determines whether the measured distance result Mag-b is inability data NG. If the measured distance result Mag-b is not inability data NG, the processing goes to a step ST18 while if the measured distance result Mag-b is inability data NG, the processing goes to a step ST19.

At the step ST18, the controller 50 sets the measured distance result Mag-b as the representative value Magd of the measured distance results and the processing is completed. At the step ST19, the controller 50 sets the inability data NG as the representative value Magd of the measured distance results and the processing is completed.

Thus, in this embodiment, plural fields of view for distance measurement are provided and priorities are set to each of them. If a field of view for distance measurement having higher priority is inability data NG, a measured distance result by a field of view that is offsite outwardly and/or a field of view that has a wide angle is used. This allows a distance to the subject to be surely measured as compared with a case where only one field of view for distance measurement is used.

At step ST3 shown in FIG. 10, the controller 50 detects a current position of a focal point FPs of the focus lens 21 based on a detection signal RSf received from the lens-position-detecting unit 21a.

At a step ST4, the controller 50 performs any lens-drive-setting processing. In such the lens-drive-setting processing, a driving direction and a driving speed of the focus lens 21 is set based on the current position of the focal point FPs and the representative value Magd of the measured distance results.

At a step ST5, the controller 50 then performs lens drive processing.

Figure 12:
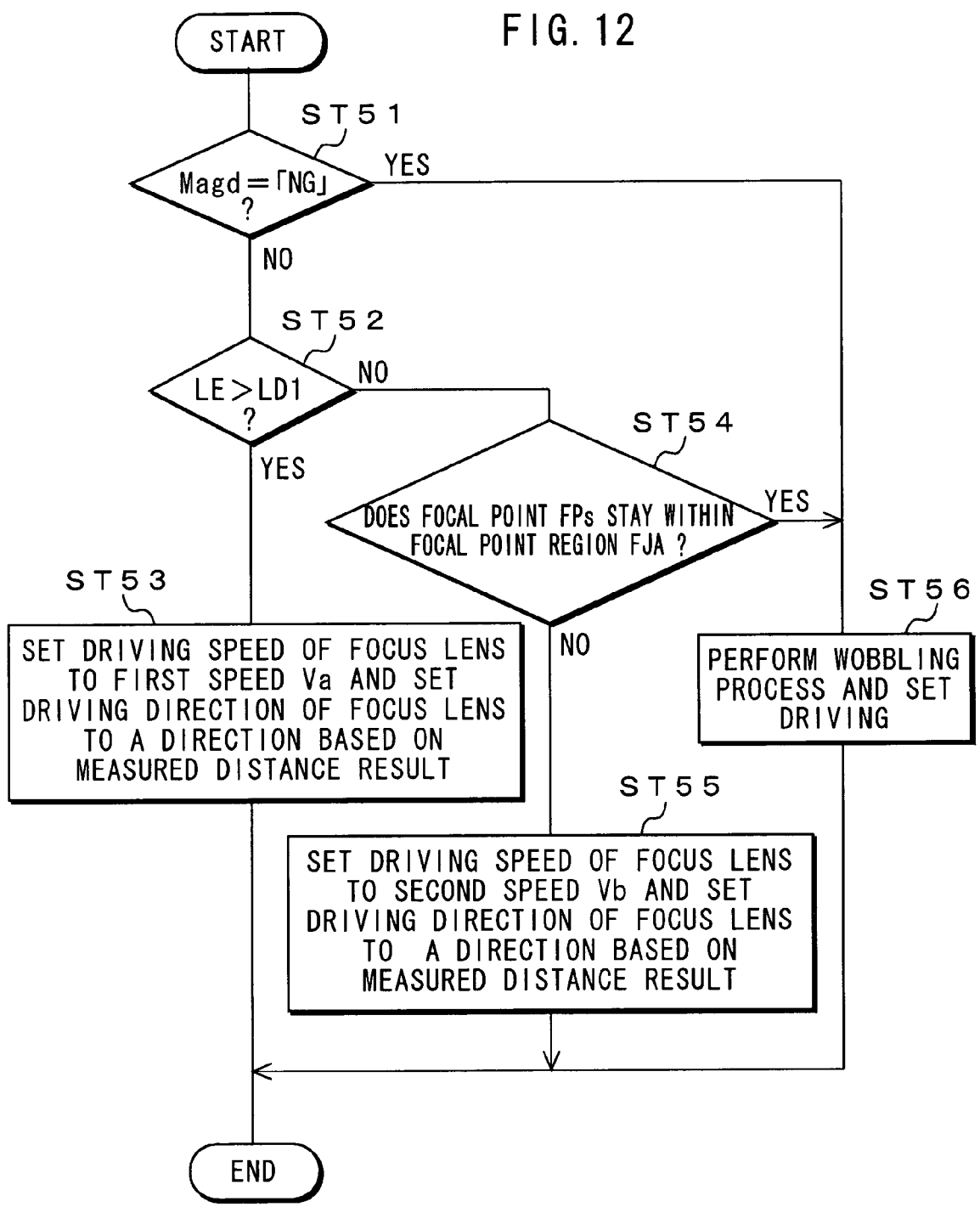
FIG. 12 is a flowchart for showing lens-drive-setting processing.

FIG. 12 shows a flowchart of the lens-drive-setting processing.

At a step ST51, the controller 50 determines whether the representative value Magd of the measured distance results is inability data NG. If the representative value Magd of the measured distance results is not inability data NG, the processing goes to a step ST52 while if the representative value Magd of the measured distance results is inability data NG is inability data NG, the processing goes to a step ST56.

At the step ST52, the controller 50 determines whether the current position of the focal point FPs stays away from the in-focus region FJA based on the representative value Magd of the measured distance results with it staying further away from a first determined distance LD1. If a distance LE from the current position of the focal point FPs to the in-focus region FJA based on the representative value Magd is longer than the first determined distance LD1, the processing goes to a step ST53 while if not, the processing goes to a step ST54.

The in-focus region FJA is set relative to the representative value Magd so that an in-focus position FPj on a subject, which corresponds to the representative value Magd, can be included therein. For example, an erroneous region of distance measurement based on the representative value Magd is set to the in-focus region FJA. Alternatively, a region that is wider than the erroneous region of distance measurement based on the representative value Magd may be set to the in-focus region FJA. An amount of the first determined distance LD1 can be set taking into consideration a control facility of the focus lens 21. Namely, if the focus lens 21 is tried to be driven at a first driving speed Va, which will be described later, when the first determined distance LD1 is too short, the focus lens would have already reached the in-focus position FPj before it reaches to the first driving speed Va. If the focus lens 21 is driven at a very high speed, it may take much time to stop the focus lens 21, so that if the focus lens 21 is tried to stop when the focus lens 21 reaches near the in-focus position FPj, the focus lens 21 may pass through the in-focus position FPj, thereby resulting in poor focus operation. Therefore, the first determined distance LD1 can be set based on a maximum speed and control facility when the focus lens 21 is driven. Since such the maximum speed and control facility are different based on focus length and an iris value, the first determined distance LD1 can be adjusted based on the focus length and the iris value.

At the step ST53, the controller 50 sets a driving speed of the focus lens 21 to the first driving speed Va to let the focal point FPs of the focus lens 21 rapidly arrive the in-focus position FPj because the current position of the focal point FPs of the focus lens 21 stays away from the in-focus region FJA with the position of the focal point staying further away from the first determined distance LD1. The controller 50 also sets a driving direction of the focus lens 21 to a direction based on the representative value Magd. In other wards, the driving direction is set so that the focal point FPs of the focus lens 21 can be driven toward a direction of a position of a focal point FPm indicated by the representative value Magd. Since it is possible to correctly determine a driving direction of the focus lens 21 based on the representative value Magd by the distance measurement sensor 45, any wobbling is not necessary for determining its driving direction thereof.

The first driving speed Va of the focus lens 21 is used for allowing the focal point of the focus lens 21 to be rapidly approached to the in-focus position. It is not necessary to limit its driving speed to prevent the focal point thereof from passing through the peak in the curve of the focus evaluation values because every focus evaluation value is revised only one time per one field. Thus, the first driving speed Va may be maximum one of allowable driving speeds when the focus lens 21 is driven.

The processing then goes to the step ST54 where the controller 50 determines whether a current position of the focal point FPs of the focus lens 21 stays within the in-focus region FJA. If no position of the focal point FPs stays within the in-focus region FJA, the processing goes to a step ST55 while if the position of the focal point FPs stays within the in-focus region FJA, the processing goes to a step ST56.

At the step ST55, the controller 50 sets a driving speed of the focus lens 21 to a second driving speed Vb that is slower than the first driving speed Va. The controller 50 also sets a driving direction thereof to a direction based on the representative value Magd. In other words, the driving direction thereof is set so that the focal point FPs of the focus lens 21 can be driven toward a direction of a position of a focal point FPm indicated by the representative value Magd. This second driving speed Vb is set to allow a speed change from the second driving speed Vb to a third driving speed Vc that is slower than the second driving speed vb to be smoothly achieved in order to prevent a curve of the focus evaluation values indicating an alteration in the focus evaluation values when the focus lens 21 is driven from being dwarfed.

For example, it is estimated that a depth-of-field is Fs, the second driving speed Vb is set to 12 Fs/field. It is to be noted that the third driving speed Vc is set to a speed that is capable of detecting a peak of the curve of the focus evaluation values accurately, for example, 2 Fs/field. If the maximum one of allowable speeds when the focus lens 21 is driven is not more than 12 Fs/field, the first driving speed Va is equal to the second driving speed Vb.

When the processing goes to the step ST56 from the step ST51 or ST54, the controller 50 performs wobbling similar to the past cases, and sets a driving direction of the focus lens 21 based on an alteration in the focus evaluation values when the wobbling lens 22 is driven. In this case, the controller 50 sets a driving speed of the focus lens 21 to the second driving speed Vb thereof. If a distance between the current position of the focal point FPs and a position of the focal point FPm is short, the controller 50 can set a driving speed of the focus lens 21 to the third driving speed Vc thereof because the current position of the focal point FPs stays near the in-focus position FPj.

Thereafter, at the step ST5 shown in FIG. 10, the controller 50 performs the lens drive processing and finishes the auto-focus operations when the lens drive processing is completed. In the lens drive processing, a switch of driving speeds of the focus lens 21 and the hill-climbing control processing similar to the past cases are performed, so that the focus lens 21 is driven to meet a position of the focal point FPs thereof to the in-focus position FPj.

If a distance from a position of the focal point FPs to the in-focus region FJA is shorter than a second determined distance LD2 that is shorter than the first determined distance LD1, the driving speeds of the focus lens 21 is switched from the first driving speed Va to the second driving speed Vb. The second determined distance LD2 is set so that the driving speed of the focus lens 21 can be decreased to the second driving speed Vb within the in-focus region FJA when the driving speed of the focus lens 21 is switched from the first driving speed Va to the second driving speed Vb at a position, for example, away from the in-focus region FJA by the second determined distance LD2. Such the setting may prevent a focal point of the focus lens 21 from passing through a peak of the curve of the focus evaluation values in the in-focus region FJA because of less numbers of the focus evaluation values.

In the hill-climbing control processing, any increase and decrease in the focus evaluation values calculated by the focus evaluation value-calculating unit 37 are detected and the focal point FPs of the focus lens 21 is driven so that this detected focus evaluation value can be maximum value, thereby meeting a position of the focal point FPs to the in-focus position FPj. In the hill-climbing control processing using the focus evaluation values in this embodiment, the focal point FPs of the focus lens 21 is driven so that the above focus evaluation value ID0, ID2 or the like is maximum value. If pixels having larger brightness increase, an evaluation window size W1 is switched to an evaluation window size W5 and the focus evaluation value is calculated by using the focus evaluation value ID8, in order to prevent the focus lens 21 from being driven to a direction where blur occurs. Further, by using the focus evaluation value ID0 and other focus evaluation values ID1 through ID7 and ID9 through ID13, a change of driving speeds of the focus lens 21 can be determined, any vibrations of the video camera can be determined, a reverse driving of the focus lens 21 can be determined, and a reach of focus lens 21 to its Near point or Far point can be determined. Based on these determination results, driving operations of the focus lens 21 is controlled to achieve an excellent accurate focusing. Thus, the focus processing of the steps ST4, ST5 is performed to meet the position of the focal point of the focus lens 21 to the in-focus position FPj. The autofocus operations then finish.

Figure 13:
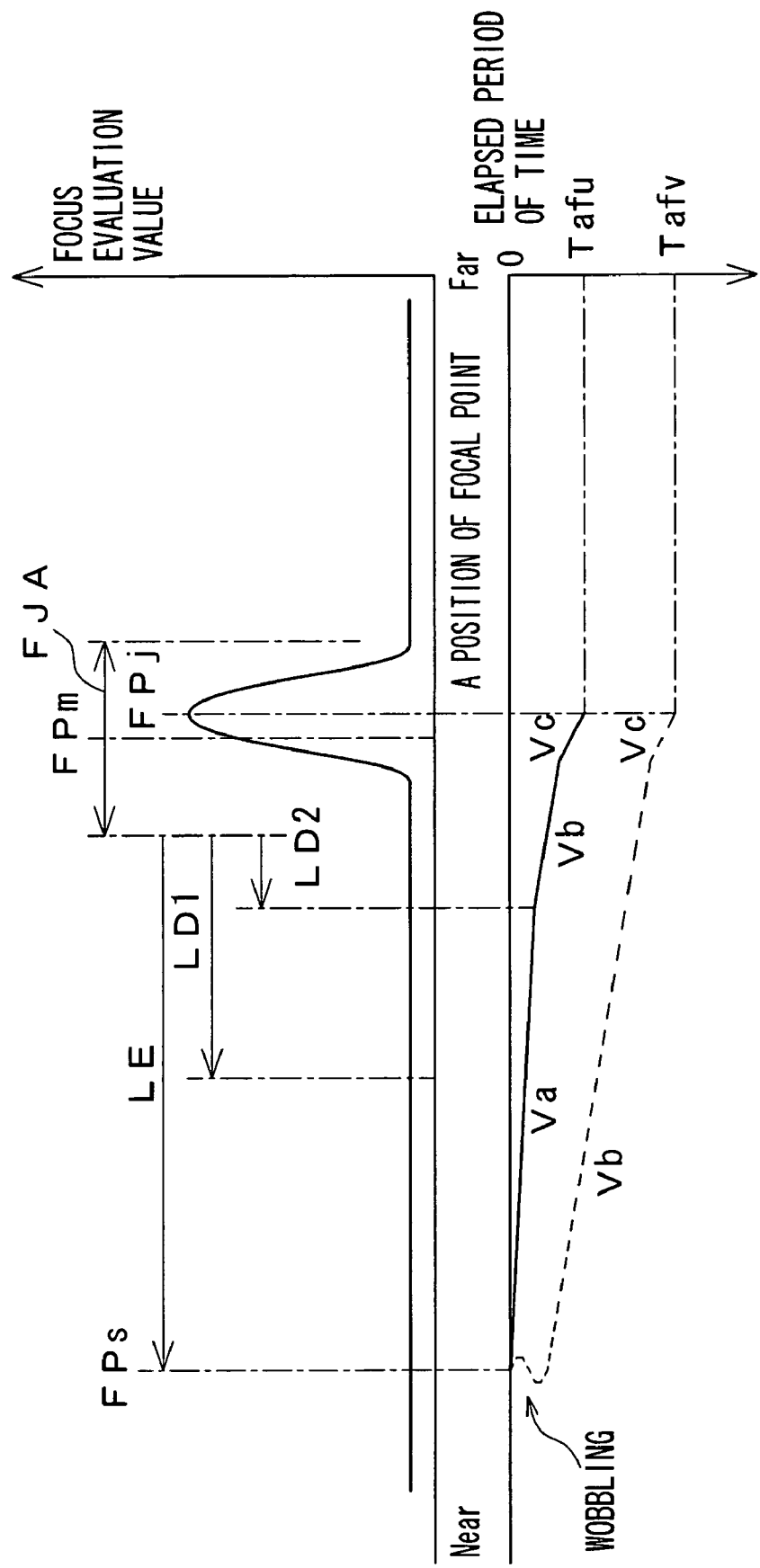
FIG. 13 is a diagram for explaining autofocus operations using the representative value of the measured distance results.

FIG. 13 shows the autofocus operations using the measured distance result. When a current position of the focal point FPs of the focus lens 21 stays away from the in-focus region FJA based on the representative value Magd with the position of the focal point staying further away from the first determined distance LD1, namely, the distance LE from the current position of the focal point FPs to the in-focus region FJA based on the representative value Magd is longer than the first determined distance LD1, the focus lens 21 is driven at the first driving speed Va without any wobbling. The focus lens 21 is then driven at the second driving speed Vb and the third driving speed Vc. When a period of time Tafu is elapsed, the position of focal point FPs meets the in-focus position FPj. This allows a period of focusing time to be much shortened as compared with the past autofocus operations, shown in FIG. 10 by broken lines, such that wobbling is performed to determine a direction where the focus lens is driven, the focus lens 21 is then driven at the second driving speed Vb, and when a period of time Tafv is elapsed, the position of focal point FPs meets the in-focus position FPj.

When a current position of the focal point FPa stays nearer the in-focus region FJA based on the measured distance result Mag than the first determined distance LD1 with the position of the focal point staying out of the in-focus region FJA, the focus lens 21 is driven at the second driving speed Vb without any wobbling. This allows a period of focusing time to be shortened as compared with the past autofocus operation such that the wobbling is performed at a start point of the autofocus operation.

When a current position of the focal point FPs of the focus lens 21 stays within the in-focus region FJA, the autofocus operations in this embodiment is carried out so that a position of the focal point FPs can be met to the in-focus position FPj similar to the past autofocus operations but the embodiments of the invention may expect same focusing accuracy as that of the past autofocus operation even if it takes any shorten period of focusing time.

Thus, in the above embodiments, since plural fields of view for distance measurement are provided in the distance measurement sensor 45, it is possible to enhance distance measurement accuracy without any influence of the background if the measured distance results by the fields of view for distance measurement are selected and used. If imaging a subject having a small difference in its contrasts, it is possible to measure the distance to the subject, thereby enhancing its distance measurement performance.

In the above embodiment, it is possible to obtain the measured distance results to the subject surely. By a representative value of the measured distance results instead of wobbling, it is possible to determine a driving direction of the focus lens and a rough amount of lens driving to the in-focus position thereof, thereby shortening the period of focusing time as compared with the past art.

Although an imaging device has been described as a video camera in the above embodiments, this invention is not limited thereto. This invention is applicable to any other imaging device such as digital still camera.

It should be understood by those skill in the art that various modifications, combinations, sub-combinations and alterations may occur depending on design requirements and other factors insofar as they are within the scope of the appended claims or the equivalents thereof.

What is claimed is:

1. An autofocus device comprising:
   a lens-driving unit that drives a lens;
   a focal-point-position-detecting unit that detects a position of a focal point of the lens;
   a distance measurement sensor that measures a distance to a subject based on each of a plurality of fields of view for distance measurement, the plurality of fields of view for distance measurement including:
   a reference field of view for distance measurement having a first angle of view,
   one or more fields of view for distance measurement being offset outwardly from the reference field of view for distance measurement, and
   one or more fields of view for distance measurement having a second angle of view which is greater than the first angle of view; and
   a control unit that performs a focusing operation to control the lens-driving unit to drive the lens, thereby meeting the position of the focal point of the lens detected by the focal-point-position-detecting unit to an in-focus position thereof,
   wherein the control unit allows the focusing operation to start by setting the lens drive based on a representative value that is selected from the measured distance obtained by the distance measurement sensor and the position of the focal point of the lens detected by the focal-point-position-detecting unit.

2. The autofocus device according to claim 1, wherein each of the plurality of fields of view for distance measurement has a priority; and
   wherein, when the measured distance is obtained based on the plurality of fields of view for distance measurement, the selected representative value is a measured distance having a highest priority.

3. The autofocus device according to claim 1, wherein the plurality of fields of view for distance measurement are set to be consecutively arranged.

4. The autofocus device according to claim 1, wherein the reference field of view for distance measurement is along an optical axis of the lens.

5. The autofocus device according to claim 1, wherein one of the distance measurement sensor and the control unit selects the representative value of the measured distance.

6. An autofocus method comprising:
   a focal-point-position-detecting step of detecting a position of a focal point of the lens;
   a distance-measuring step of measuring a distance to a subject based on each of a plurality of fields of view for distance measurement, the plurality of fields of view for distance measurement including:
   a reference field of view for distance measurement having a first angle of view,
   one or more fields of view for distance measurement being offset outwardly from the reference field of view for distance measurement, and
   one or more fields of view for distance measurement having a second angle of view which is greater than the first angle of view;
   a representative-value-selecting step of selecting a representative value from the measured distance obtained in the distance-measuring step; and
   a focus-processing step of starting the focusing operation to meet the position of the focal point of the lens detected in the focal-point-position-detecting step to an in-focus position thereof by setting the lens drive based on the representative value of the measured distance and the detected position of the focal point of the lens.

7. A computer-readable medium storing a computer program that when executed on a computer causes an autofocus processing, the program comprising:
 a focal-point-position-detecting step of detecting a position of a focal point of the lens;
 a distance-measuring step of measuring a distance to a subject based on each of a plurality of fields of view for distance measurement, the plurality of fields of view for distance measurement including:
  a reference field of view for distance measurement having a first angle of view,
  one or more fields of view for distance measurement being offset outwardly from the reference field of view for distance measurements, and
  one or more fields of view for distance measurement having a second angle of view which is greater than the first angle of view;
 a representative-value-selecting step of selecting a representative value from the measured distance obtained in the distance-measuring step; and
 a focus-processing step of starting the focusing operation to meet the position of the focal point of the lens detected in the focal-point-position-detecting step to an in-focus position thereof by setting the lens drive based on the representative value of the measured distance and the detected position of the focal point of the lens.

* * * * *